US008839197B2

(12) United States Patent
Claussen et al.

(10) Patent No.: US 8,839,197 B2
(45) Date of Patent: Sep. 16, 2014

(54) AUTOMATED ANALYSIS OF COMPOSITE APPLICATIONS

(75) Inventors: Ryan T. Claussen, Rochester, MN (US); Eric N. Herness, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/901,847

(22) Filed: Oct. 11, 2010

(65) Prior Publication Data

US 2012/0089963 A1 Apr. 12, 2012

(51) Int. Cl.
*G06F 9/44* (2006.01)
*G06F 9/445* (2006.01)
*G06F 11/36* (2006.01)

(52) U.S. Cl.
CPC .............. *G06F 9/44589* (2013.01); *G06F 8/75* (2013.01); *G06F 8/10* (2013.01); *G06F 11/3604* (2013.01)
USPC .......................................................... 717/126

(58) Field of Classification Search
USPC .......................................................... 717/126
See application file for complete search history.

(56) References Cited

U.S. PATENT DOCUMENTS 7,483,901 B1 * 1/2009 Massoudi et al. ............. 717/126
8,219,975 B2 * 7/2012 Goossen et al. .............. 717/122
8,271,541 B2 * 9/2012 Mohan et al. ................. 707/803
2009/0177508 A1 * 7/2009 Leung ............................... 705/7
2010/0005451 A1 1/2010 Hirose et al.
2010/0037201 A1 * 2/2010 Salle et al. .................... 717/104
2011/0078650 A1 * 3/2011 Weber et al. .................. 717/104
2011/0283269 A1 * 11/2011 Gass et al. .................... 717/168

FOREIGN PATENT DOCUMENTS

WO 2009071440 A1 6/2009

OTHER PUBLICATIONS

Gaaloul et al., "Verifying Composite Service Transactional Behavoir Using Event Calculus," Springer-Verlag, 2007, 18pg.*
Peyton et al., "Integration Testing of Composite Applications," IEEE, 2008, 10pg.*
Vyatkin et al., "A Modeling Approach for Verification of IEC1499 Funtion Blocks Using Net Condition/Event Systems," IEEE, 1999, 10pg.*
Zhao et al., "HyperService: Linking and Exploring Services on the Web," IEEE, 2010, 8pg.*
Zuohua Ding et al., "A Rigorous Model of Service Component Architecture," Electronic Notes in Theoretical Computer Science, Elsevier B.V., Apr. 10, 2008, vol. 207, pp. 33-48, Abstract, Sections 3 and 4.
Tetsuya Nagashima, "Essence of SOA Based IT Architecture," Provision, IBM Japan, Ltd., Oct. 30, 2006, vol. 13, No. 4, pp. 40-45.
International Search Report, Form PCT/ISA/210, dated Nov. 22, 2011.

* cited by examiner

*Primary Examiner* — Ryan Coyer
(74) *Attorney, Agent, or Firm* — Martin & Associates, LLC; Derek P. Martin

(57) ABSTRACT

An application analysis mechanism analyzes a composite application for conformance to a set of component interaction rules that define one or more conditions that should be satisfied between components written in different languages, along with an action that is performed depending on the analysis of the conditions. Once the component interaction rules are defined, the composite application is received. Next, a model of the composite application is built that separates components of the composite application into categories based on the programming language used, and includes metadata to describe interaction between components. The set of component interaction rules is then run against the model of the composite application. The results of the analysis are then output. The automated analysis of composite applications removes much of the process that is prone to human errors to provide an efficient and consistent approach for analyzing composite applications.

8 Claims, 8 Drawing Sheets

810

Component Interaction Rule (Late Binding)

```
foreach (Export e: Model.getExports()){                    — 820
    foreach(BPEL b: Model.getBpels()){                     — 830
        if(b.getContent().contains(e.getTarget())){        — 840
                b.setEarlyBound(true);                     — 850
                b.addWarning("Early-bound process.         — 860
        New version of BPEL not picked up automatically");
                }
        }
}
```

Component Interaction Rule (Invocation Issue)

```
foreach(Component c: Model.getComponents()){               — 920
    if(c.getImplType()=="BPEL"){                           — 930
        Java j = Model.getJava(c.getImplName());           — 940
        if(j.getContent().contains("invoke(") &&           — 950
c.getReferenceType() ==   "async"){
            c.addWarning("Inconsistent invocation type on – 960
        reference with POJO " +j.getName());
            j.addWarning("Inconsistent invocation type on – 970
        reference with Component" +c.getName());
                }
        }
}
```

Component Interaction Rule (Invocation Style)

```
foreach(Component c: Model.getComponents()){                1020
    if(c.getImplType()=="Java"){                            1030
        Vector<Import>imports = c.getImports();             1040
            foreach(Import i:imports){                      1050
                if(i.joinTran()== false){                   1060
                    c.addWarning("Import does not join      1070
                transaction.  Backend inconsistencies may
                result if error.");
                        }
                }
        }
}
```

Results

6 Selectors
60 Exports
21 Web Service (JAX-RPC based if not SOAP/JMS)
39 SCA
12 Jars
128 WSDLs
64 use web services
1194 total operations
1651 total faults
27 SCA Modules
20 mediation modules
7 business modules
1228 Java Files
42 of which are POJOs
2 WPS Libraries
100 Components
21 Mediations
194 XSDs
172 BOs
753 fields
1 Stand-alone Human Tasks
2 State Machines
16 total states
78 Imports
2 EJB
21 Web Service (JAX-RPC based if not SOAP/JMS)
55 SCA
15 Business Process
7 long-running
0 with compensation
210 total activities
91 Java snippets
0 Inline human tasks
4 Business Rule Sets
10 rules
10 templates

Results (continued)

Statistics
On average each WSDL contains 9.328125 operation(s).
On average there are 12.8984375 faults/WSDL.
On average there are 1.382747 faults/operation.
On average each XSD contains 3.8814433 field(s).
On average there are 0.88659793 BOs/XSD.
On average there are 4.377907 fields/BO.
On average there are 14.0 activities/BPEL.

Warnings
Utilizes 'EObject'! Migration problems ahead in v7!
Preferred interaction style unset for Exports!
Macroflows do not utilize compensation.
BPEL Component utilizes Early Binding!
Preferred interaction style unset for Imports!

FIG. 12

AUTOMATED ANALYSIS OF COMPOSITE APPLICATIONS

BACKGROUND

1. Technical Field

This disclosure generally relates to analyzing composite applications, and more specifically relates to automated analysis of composite applications for conformance to a set of rules that specify interaction between components.

2. Background Art

Computer programs have evolved over the years, beginning with simple programs written in assembly code to relatively complex programs writing in a high level language. Recent developments in computer programming include writing different portions of a complex computer program in different programming languages. Service Component Architecture (SCA) is an initiative advocated by several major software vendors that specifies requirements for applications that conform to service-oriented architecture. In SCA, applications are referred to as "composite applications" because they are made up of a number of different components in multiple programming languages. International Business Machines Corporation (IBM) offers a product known as WebSphere that supports development of composite applications known as Service Component Architecture (SCA) applications.

The steps of analyzing a composite application such as an SCA application is currently done by importing the application into a WebSphere tool. A programmer then manually inspects components of applications for accepted best and worst practices, and reports findings back to the customer. Due to human nature, important details may be glossed over or completely missed, negatively impacting support provided to the customer. Results generated by this manual process are also likely to be inconsistent over time and as new rules are created, earlier results are not recreated due to the labor cost associated with such an effort.

Known tools for software analysis allow performing static analysis of computer program written in a single language, but do not support analyzing a composite application with multiple components written in different programming languages. Without a way to automate the analysis of composite applications, the current manual process will continue to be error-prone and inefficient.

BRIEF SUMMARY

An application analysis mechanism analyzes a composite application for conformance to a set of component interaction rules that define one or more conditions that should be satisfied between components written in different languages, along with an action that is performed depending on the analysis of the conditions. Once the component interaction rules are defined, the composite application is received. Next, a model of the composite application is built that separates components of the composite application into categories based on the programming language used, and includes metadata to describe interaction between components. The set of component interaction rules is then run against the model of the composite application. The results of the analysis are then output. The automated analysis of composite applications removes much of the process that is prone to human errors to provide an efficient and consistent approach for analyzing composite applications to assure the interaction between components written in different programming languages satisfies the component interaction rules.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 8 shows a first sample component interaction rule;

FIG. 9 shows a second sample component interaction rule;

FIG. 10 shows a third sample component interaction rule; and

FIGS. 11 and 12 show sample results output by the application analysis mechanism for a sample composite application.

DETAILED DESCRIPTION

The claims and disclosure herein provide an application analysis mechanism that automatically analyzes a composite application for conformance to a set of component interaction rules. The rules define interaction between components written in different programming languages. The composite application is received, and a model is generated of the composite application that separates the components into different categories according to their programming language, and provides metadata that describes interaction between categories. The rules are then run against the model, and the results of the analysis are output to the user. Results may include statistics and warnings. The result is a software tool that automatically analyzes composite applications for conformance to the component interaction rules.

Figure 1:
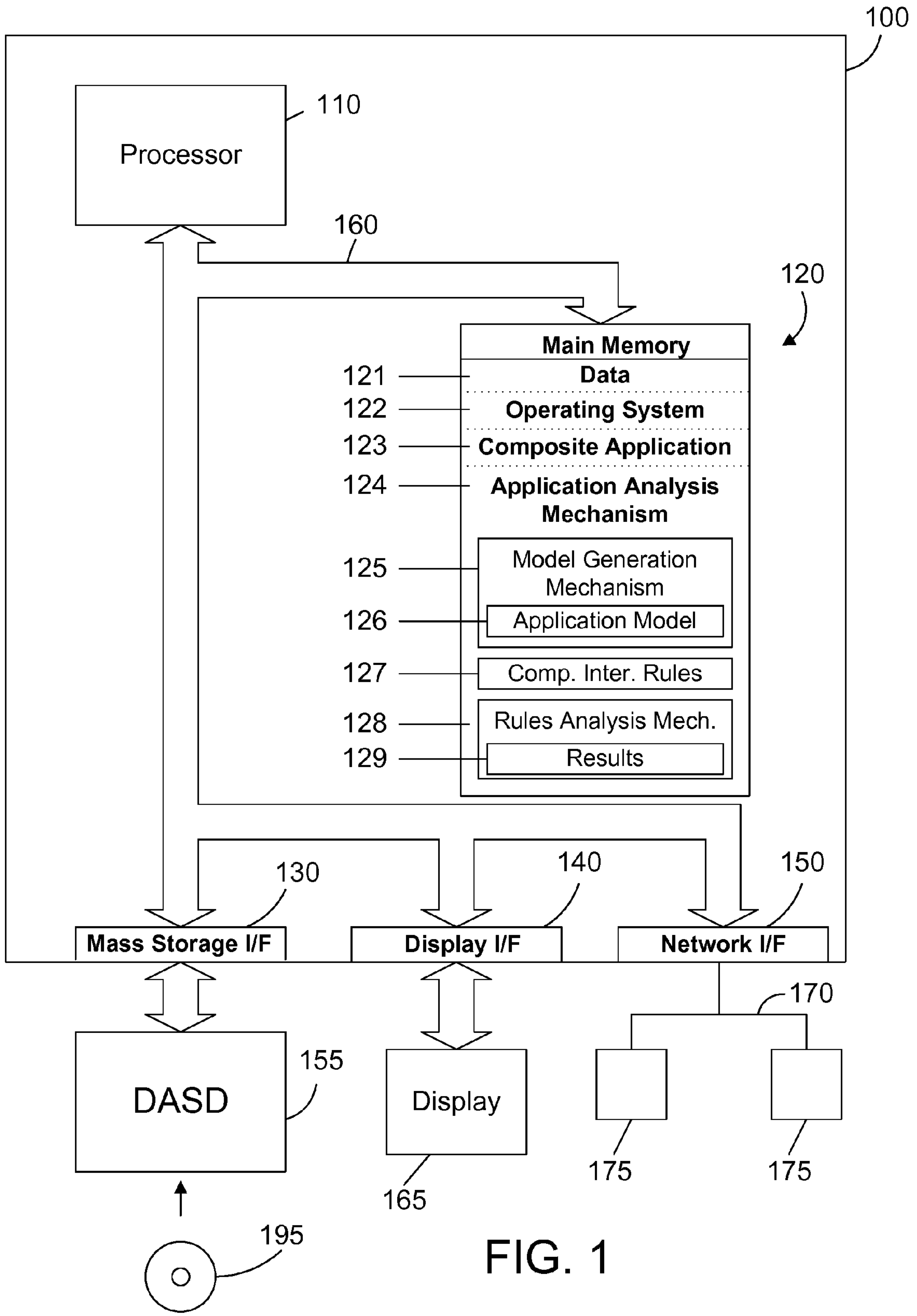
FIG. 1 is a block diagram of an apparatus that includes an application analysis mechanism that automatically analyzes a composite application for conformance to a set of defined component interaction rules.

Referring to FIG. 1, a computer system 100 is one suitable implementation of a computer system that includes an application analysis mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a composite application 123, and an application analysis mechanism 124. Data 121 represents any data that serves as input to or output from any program in computer system 100. Operating system 122 is a multitasking operating system. Composite application 123 is an application that includes multiple components written in different programming languages. The application analysis mechanism 124 includes a model generation mechanism 125, component interaction rules 127, and a rules analysis mechanism 128. The model generation mechanism 125 receives the composite application 123, and generates from the composite application an application model 126. The application model 126 preferably groups components according to programming language and includes metadata that describes best practice and worst practice interaction between components. The component interaction rules 127 specify one or more conditions between components that should be satisfied, along with one or more actions to perform if the conditions are not satisfied. The rules analysis mechanism 128 runs the component interaction rules 127 against the application model 126, and outputs results 129. The results 129 may include statistics and warnings, and may be output to a user's display or stored in some electronic form in a memory or on a physical medium. The result is an application analysis mechanism 124 that automatically analyzes a composite application for conformance to the component interaction rules.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, composite application 123 and application analysis mechanism 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the application analysis mechanism 124.

Although computer system 100 is shown to contain only a single processor and a single system bus, those skilled in the art will appreciate that an application analysis mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
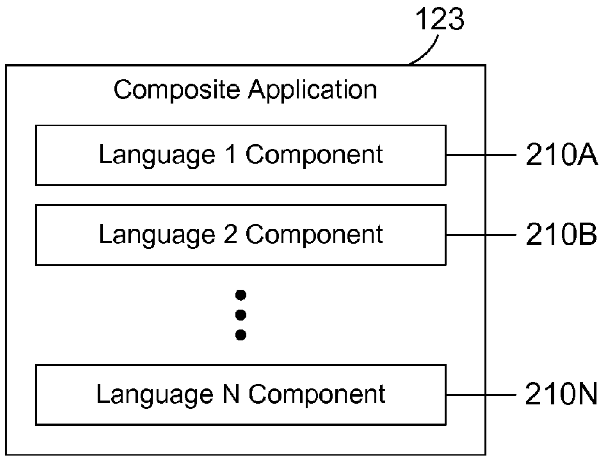
FIG. 2 is a block diagram that shows one suitable implementation for the composite application of FIG. 1.

Referring to FIG. 2, a sample implementation for composite application 123 includes multiple components written in multiple programming languages, shown in FIG. 2 as language 1 component 210A, language 2 component 210B, . . . , language N component 210N. Because the composite application 123 includes components in different programming languages, known static analysis tools are inadequate to analyze the interactions between components of the composite application 123.

Figure 3:
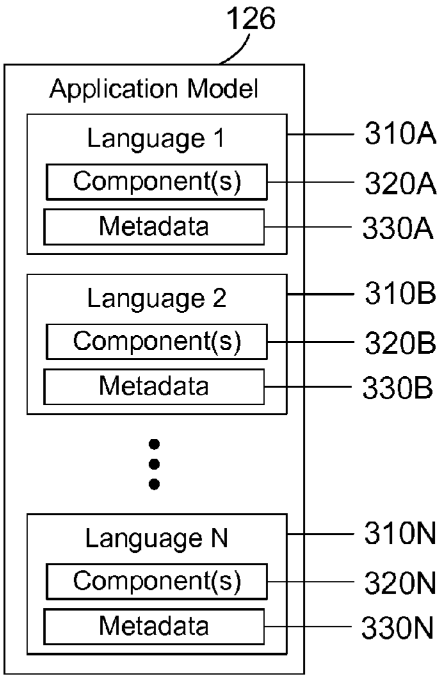
FIG. 3 is a block diagram of an application model showing components grouped according to their programming language.

Referring to FIG. 3, a sample implementation for the application model 126 includes multiple language categories with each component placed in a category according to the programming language of the component, and with each category including metadata that describes best practice and worst practice interaction between component types. The metadata that describes best practice and worst practice interaction may come from any suitable source, but preferably comes from the Service Component Definition Language (SCDL). Thus, application model 126 preferably includes multiple language categories, shown in FIG. 3 as language 1 310A, language 2 310B, . . . , language N 310N. Each language category includes corresponding components written in that language, along with suitable metadata that describes interaction between components in the category with components in one or more different categories. Thus, language 1 310A includes one or more corresponding components 320A and metadata 330A; language 2 310B includes one or more corresponding components 320 B and metadata 330B, and so on through language N 310N, which includes one or more corresponding components 320N and metadata 330N.

Figure 4:
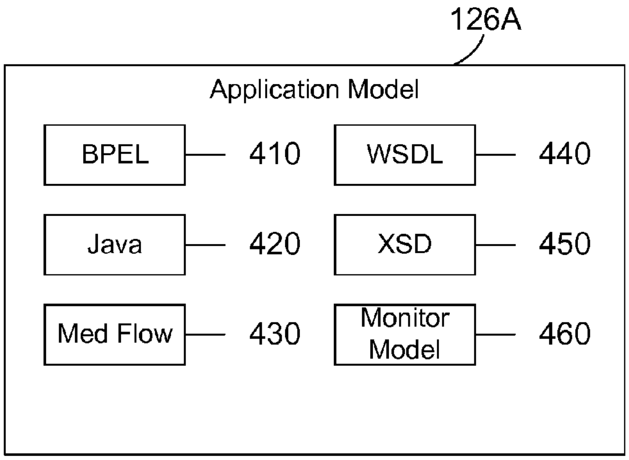
FIG. 4 is a block diagram of one specific implementation for the application model in FIGS. 1 and 3 that includes six different programming languages.

One specific example of an application model 126 is shown as application model 126A in FIG. 4. In this particular application model, there are six different categories, with each corresponding to a different programming language. The six categories shown in FIG. 4 include Business Process Execution Language (BPEL) 410; Java 420; Mediation Flow Control (Med Flow) 430; WebService Definition Language (WSDL) 440; eXtensible Markup Language (XML) Schema Document (XSD) 450; and Monitor Model 460. The application model 126A is a model of a composite application that includes all of the six categories shown. Each of the six categories shown 410, 420, 430, 440, 450 and 460 in FIG. 4 are suitable examples of languages shown in FIG. 3 as 310A, 310B, . . . , 310N. Each component in the composite application will be assigned to one of the categories according to the programming language of the component. In addition, each category includes metadata that describes interaction between components in the category with components in one or more different categories.

Figure 5:
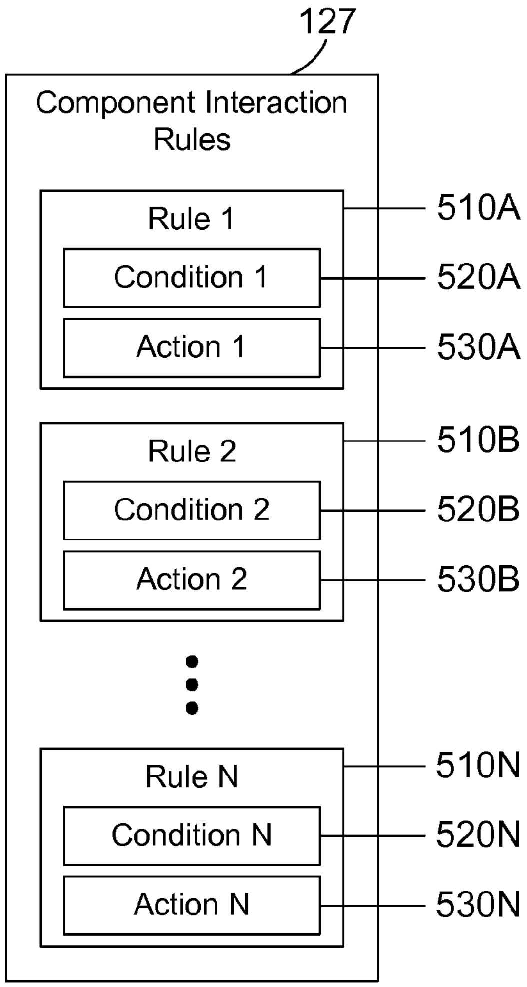
FIG. 5 is a block diagram showing a set of component interaction rules.

FIG. 5 shows one suitable implementation for component interaction rules 127 shown in FIG. 1. Component interaction rules 127 preferably include multiple rules that each specify a condition and a corresponding action. Thus, rule 1 510A includes a condition 520A and an action 530A; rule 2 510B includes a condition 520B and an action 530B; through rule N 510N which includes a condition 520N and a corresponding action 530N. The corresponding action for each rule may include adding a warning to the results of the analysis.

Figure 6:
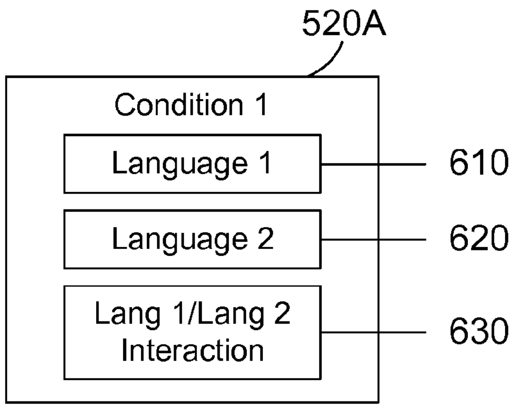
FIG. 6 is a block diagram showing one particular implementation for a condition in a component interaction rule.

One suitable implantation for a condition, such as condition 520A shown in FIG. 5, is shown in FIG. 6. The condition 520A preferably specifies a first language 610, a second language 620, and some interaction between the languages 630. In one specific implementation, the interaction 630 is a desired interaction (best practice) such that if the condition 520A is not satisfied, a warning will be added to the results of the analysis to indicate the desired interaction between components was not present. In an alternative implementation, the interaction 630 is an undesired interaction (worst practice) such that if the condition 520 is satisfied, a warning will be added to the results of the analysis to indicate the undesired interaction between components is present. The examples of component interaction rules and their corresponding conditions and actions shown in FIGS. 5 and 6 are shown by way of example, and are not limiting. The disclosure and claims herein expressly extend to any suitable component interaction rules that may be run against an application model corresponding to the composite application.

Figure 7:
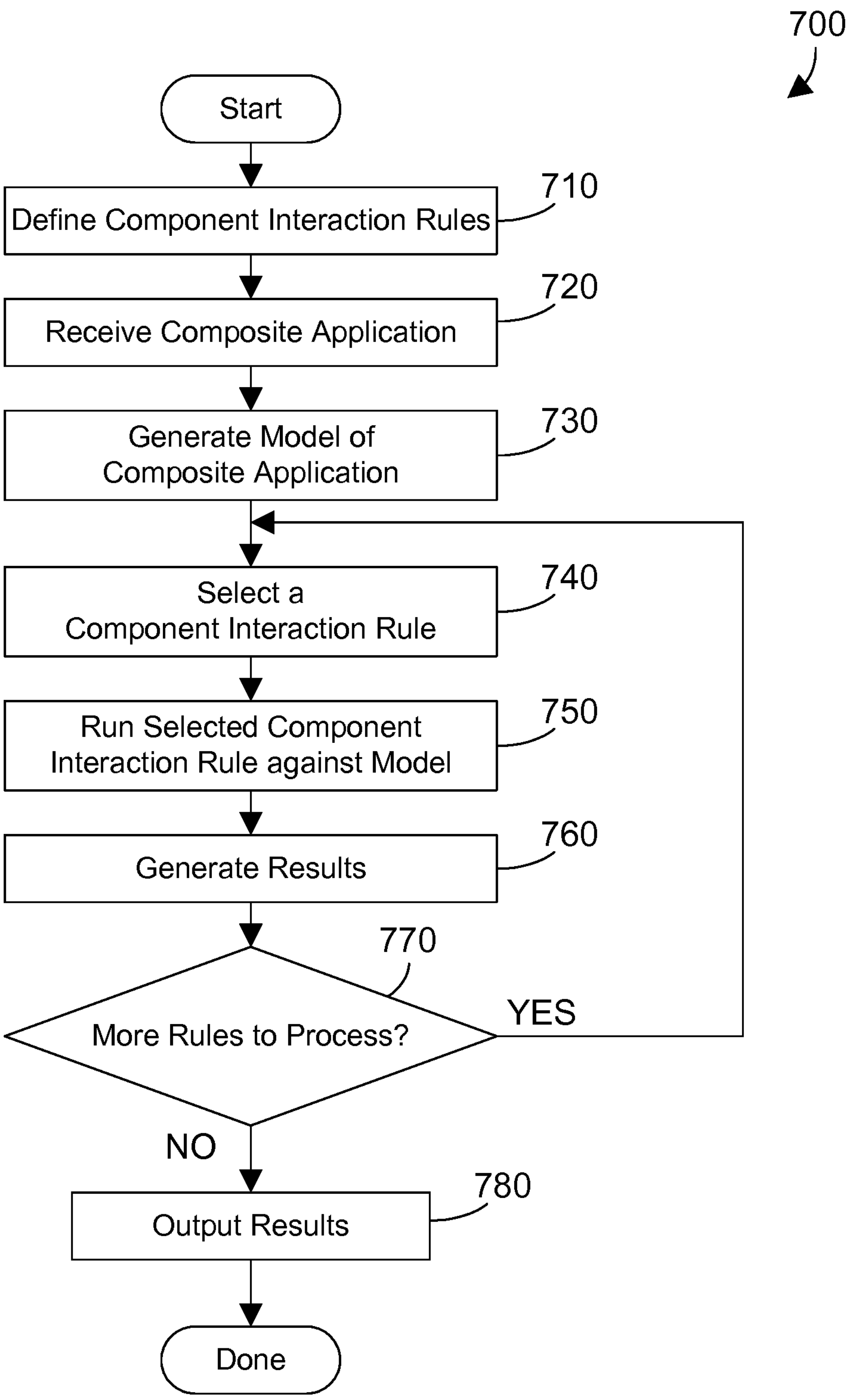
FIG. 7 is a flow diagram of a method for automatically analyzing a composite application for conformance to a set of component interaction rules.

Referring to FIG. 7, a method 700 is preferably performed by the application analysis mechanism 124 when executed by one or more processors 110. First, the component interaction rules are defined (step 710). In one specific implementation, the component interaction rules are defined by a human user. However, the component interaction rules could be defined by software as well. For example, a rule generation mechanism could analyze interaction between components of a proven, robust composite application, and could automatically generate one or more component interaction rules. The component interaction rules expressly extend to both rules defined by a human user and rules automatically generated by a computer process.

Once the rules are defined in step 710, the composite application is received (step 720). A model of the composite application is then generated (step 730). As described above with reference to FIGS. 3 and 4, an application model preferably includes multiple categories that each correspond to a different programming language, with each component placed in a category according to the programming language of the component, along with metadata that describes interaction between components in the category with components in one or more different categories. A component interaction rule is then selected (step 740). The selected component interaction rule is run against the model (step 750). Results are generated (step 760). When there are more rules to process (step 770=YES), method 700 loops back to step 740 and continues until there are no more rules to process (step 770=NO), at which point the results are output (step 780), and method 700 is done. Note the results generated in step 760 and/or output in step 780 may include statistics for the composite application, as well as warnings.

Specific examples of suitable component interaction rules are shown in FIGS. 8-10. Component interaction rules 810, 910 and 1010 in FIGS. 8-10 are specific examples of component interaction rules 127 shown in FIGS. 1 and 5. The component interaction rule 810 shown in FIG. 8 relates to late binding, which represents best practice. The first line 820 specifies a programming construct in SCDL, while the second line 830 specifies business processes in BPEL. When the conditions in line 840 are satisfied, a Boolean variable setEarlyBound is set to true in line 850, and a warning is added to the results that the new version of BPEL is not picked up automatically in line 860.

Another example of a suitable component interaction rule 910 is shown in FIG. 9, which addresses an invocation issue. The first line 920 is a Component statement in SCDL, while the second line 930 is a Java statement that invokes a BPEL file. Lines 940 and 950 test to see if conditions are satisfied, and if so, a first warning can be added in line 960 and a second warning can be added in line 970. The logic of this rule states if a Java file invokes a BPEL component, and the BPEL component should be interacted with asynchronously at runtime, if an error occurs, the backend systems could be in an inconsistent state which would require external remediation, so appropriate warnings are added to the results.

A third example of a suitable component interaction rule 1010 is shown in FIG. 10, which addresses invocation style. Note this rule has two components defined by the same language, namely SCDL, but conforms to two different schemas, namely Component and Import, both defined using XML. Line 1020 specifies to get each component, and if the implementation type for the component is Java in line 1030, an import is selected in line 1040, and for each import in line 1050, if the import does not join a transaction in line 1060, a warning is added in line 1070 because the backend systems could end up in an inconsistent state.

Sample results that may be generated in step 760 and output in step 780 of FIG. 7 are shown as 1100 in FIGS. 11 and 12 for a sample composite application. The results include a specification of many different parameters relating to the composite application as shown in FIG. 11. The results may also include statistics that characterize the composite application, as shown in FIG. 12. The specific statistics shown in FIG. 12 include average number of operations per WSDL; average number of faults per WSDL; average number of faults per operation; average number of fields for each XSD; average business objects (BOs) per XSD; average number of fields per BO; and average number of activities per BPEL. The results may also include one or more warnings, as shown in FIG. 12. The various warnings are added to the results when the conditions in a component interaction rule specify to add a warning to the results. The results 1100 in FIGS. 11 and 12 are preferably displayed to a human programmer, who can use the statistics and warnings to determine whether the composite application will operate as expected. Of course, the statistics and warnings could also be used by an automated process that could recommend specific changes to components to comply with the component interaction rules.

The disclosure and claims disclose a way to automatically analyze a composite application that includes components written in different programming languages for conformance to a set of component interaction rules that define one or more conditions that should satisfied between components written in different languages, along with an action that is performed depending on the analysis of the conditions. A model of the composite application is generated, and the rules are run against the model. The results are output, which may include statistics and warnings for the composite application. The automated analysis of composite applications removes much of the process that is prone to human errors to provide a consistent approach for analyzing composite applications to assure the interaction between components written in different programming languages satisfies the component interaction rules.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:

at least one processor;

a memory coupled to the at least one processor;

a composite application residing in the memory, the composite application including a plurality of components written in a plurality of different programming languages;

a plurality of component interaction rules residing in the memory, each component interaction rule comprising at least one condition between components in different programming languages and at least one action to perform depending on whether the at least one condition is satisfied; and an application analysis mechanism residing in the memory and executed by the at least one processor, the application analysis mechanism generating an application model of the composite application, wherein the application model comprises:

the plurality of components in the composite application separated into a plurality of categories according to programming language; and metadata that describes interaction between components in a first of the plurality of categories with components in a second of the plurality of categories;

the application analysis mechanism analyzing the application model for conformance to the plurality of component interaction rules, and outputting results of analyzing the application model for conformance to the plurality of component interaction rules.

2. The apparatus of claim 1 wherein the at least one action comprises adding a warning to the results.

3. The apparatus of claim 1 wherein the results comprise statistics for the composite application and at least one warning.

4. The apparatus of claim 1 wherein the at least one condition specifies two programming languages and an interaction between the two programming languages.

5. An article of manufacture comprising software stored on a non-transitory storage medium, the software comprising:

an application analysis mechanism that generates an application model of a composite application that includes a plurality of components written in a plurality of different programming languages, wherein the application model comprises:

the plurality of components in the composite application separated into a plurality of categories according to programming language; and metadata that describes interaction between components in a first of the plurality of categories with components in a second of the plurality of categories;

the application analysis mechanism analyzes the application model for conformance to a plurality of component interaction rules, each component interaction rule comprising at least one condition between components in different programming languages and at least one action to perform depending on whether the at least one condition is satisfied, and outputs results of analyzing the application model for conformance to the plurality of component interaction rules.

6. The article of manufacture of claim 5 wherein the at least one action comprises adding a warning to the results.

7. The article of manufacture of claim 5 wherein the results comprise statistics for the composite application and at least one warning.

8. The article of manufacture of claim 5 wherein the at least one condition specifies two programming languages and an interaction between the two programming languages.

* * * * *